(12) United States Patent
Rosenberg et al.

(10) Patent No.: US 12,240,408 B2
(45) Date of Patent: Mar. 4, 2025

(54) LEG IMPACT PROTECTION ASSEMBLY FOR A VEHICLE

(71) Applicant: Volvo Car Corporation, Gothenburg (SE)

(72) Inventors: Johan Rosenberg, Gothenburg (SE); Sebastian Rutelin, Gothenburg (SE); Venti Saslecov, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 18/207,325

(22) Filed: Jun. 8, 2023

(65) Prior Publication Data

US 2024/0409058 A1    Dec. 12, 2024

(51) Int. Cl.
| | |
|---|---|
| *B60R 21/2338* | (2011.01) |
| *B60N 3/06* | (2006.01) |
| *B60R 21/0134* | (2006.01) |
| *B60R 21/0136* | (2006.01) |
| *B60R 21/00* | (2006.01) |
| *B60R 21/231* | (2011.01) |

(52) U.S. Cl.
CPC ............ *B60R 21/2338* (2013.01); *B60N 3/06* (2013.01); *B60R 21/0134* (2013.01); *B60R 21/0136* (2013.01); *B60R 2021/0004* (2013.01); *B60R 2021/0053* (2013.01); *B60R 2021/23153* (2013.01); *B60R 2021/23386* (2013.01)

(58) Field of Classification Search
CPC .. B60R 2021/0053; B60R 2021/23386; B60R 2021/0004; B60R 2021/23153; B60R 21/2338; B60R 21/0134; B60R 21/0136; B60R 21/231; B60N 3/06
See application file for complete search history.

(56) References Cited

U.S. PATENT DOCUMENTS

| | | | | |
|---|---|---|---|---|
| 2,834,606 | A  * | 5/1958  | Bertrand | B60R 21/20 |
| | | | | D12/400 |
| 11,225,216 | B1 * | 1/2022  | Lin | B60R 21/23138 |
| 2020/0130632 | A1 * | 4/2020  | Sekizuka | B60R 21/231 |
| 2021/0039578 | A1 * | 2/2021  | Rupp | B60R 21/207 |
| 2023/0415695 | A1 * | 12/2023 | Kerkeling | B60R 21/01552 |

FOREIGN PATENT DOCUMENTS

JP        2022125917 A   *   8/2022

* cited by examiner

*Primary Examiner* — Keith J Frisby
(74) *Attorney, Agent, or Firm* — Clements Bernard Walker; Christopher L. Bernard; Devin Cummins (57) ABSTRACT

A collision protection system for a vehicle, the collision protection system including a seat having a seat bottom attached to a floor of the vehicle. The collision protection system also includes a foot rest disposed adjacent to, attached to, or integrally formed with the floor of the vehicle. The collision protection system also includes an airbag that deploys from, adjacent to, or around the foot rest. The airbag deploys over a portion of legs of a user occupying the seat to protect the legs of the user during a collision.

20 Claims, 9 Drawing Sheets

LEG IMPACT PROTECTION ASSEMBLY FOR A VEHICLE

INTRODUCTION

The present disclosure relates generally to the automotive field. As vehicles with a high level of autonomous drive (AD) become available, new vehicle interiors are expected to evolve. For example, such AD vehicles may have more spacious interiors, as there is less need for human controls for controlling the vehicle. For the foreseeable future, AD vehicles are expected to coexist with conventional vehicles on the roads. Accordingly, there are still risks of crashes, and all vehicles need adequate safety systems.

The present introduction is provided as background context only and is not intended to be limiting in any manner. It will be readily apparent to those of ordinary skill in the art that the concepts and principles of the present disclosure may be implemented in other applications and contexts equally.

SUMMARY

The present disclosure relates to a collision protection system for a vehicle. The collision protection system includes a seat and foot rest disposed adjacent to, attached to, or integrally formed with a floor of the vehicle. The foot rest may be a separate component or a structure integrated into the floor of the vehicle and contains an airbag that deploys from, adjacent to, or around the foot rest. For example, the foot rest may actually be coupled and adjustable with or with respect to the seat. The airbag deploys over a portion of the legs of a user occupying the seat to protect the legs of the user during a collision. The airbag is tethered to the seat during the collision and configured to restrain the legs of the user during the collision.

In one illustrative embodiment, the present disclosure provides a collision protection system for a vehicle, the collision protection system including a seat having a seat bottom attached to a floor of the vehicle. The collision protection system further includes a foot rest disposed adjacent to, attached to, or integrally formed with the floor of the vehicle. The collision protection system further includes an airbag that deploys from, adjacent to, or around the foot rest. The airbag deploys over a portion of the legs of a user occupying the seat to protect the legs of the user during a collision. Optionally, the airbag is configured to restrain the legs of the user during the collision. The airbag is tethered to the seat during the collision. The airbag is positioned over the legs of the user based on one or more characteristics of the user. The airbag deploys based on one or more collision policies. At least one collision policy of the one or more collision policies causes the airbag to deploy in response to a pre-crash warning signal. At least one collision policy of the one or more collision policies causes the airbag to deploy in response to a crash detection signal.

In another illustrative embodiment, the present disclosure provides a frontal-impact protection assembly for a vehicle, the front-impact protection assembly includes a foot rest disposed adjacent to, attached to, or integrally formed with a floor of the vehicle. The frontal-impact protection assembly further includes an airbag that deploys from, adjacent to, or around the foot rest, where the airbag deploys over a portion of the legs of a user occupying the seat to protect the legs of the user during a collision. Optionally, the airbag is configured to restrain the legs of the user during the collision. The airbag is tethered to the seat during the collision. The airbag is positioned over the legs of the user based on one or more characteristics of the user. The airbag deploys based on one or more collision policies. At least one collision policy of the one or more collision policies causes the airbag to deploy in response to a pre-crash warning signal. At least one collision policy of the one or more collision policies causes the airbag to deploy in response to a crash detection signal.

In a further illustrative embodiment, the present disclosure provides a method including detecting a collision indication signal in association with a vehicle. The method further includes deploying an airbag from, adjacent to, or around a foot rest positioned in front of a seat of the vehicle, where the airbag deploys over a portion of legs of a user occupying the seat to protect the legs of the user during a collision. Optionally, the airbag is configured to restrain the legs of the user during the collision. The airbag is tethered to the seat during the collision. The airbag is positioned over the legs of the user based on one or more characteristics of the user. The airbag deploys based on one or more collision policies. At least one collision policy of the one or more collision policies causes the airbag to deploy in response to a pre-crash warning signal.

In a further illustrative embodiment, the present disclosure provides a method including detecting a collision indication signal in association with a vehicle. The method further includes deploying an airbag from, adjacent to, or around a foot rest positioned in front of a seat of the vehicle, where the airbag deploys over a portion of legs of a user occupying the seat to protect the legs of the user during a collision. Optionally, the airbag is configured to restrain the legs of the user during the collision. The airbag is tethered to the seat during the collision. The airbag is positioned over the legs of the user based on one or more characteristics of the user. The airbag deploys based the one or more collision policies. At least one collision policy of the one or more collision policies causes the airbag to deploy in response to a pre-crash warning signal.

BRIEF DESCRIPTION OF THE DRAWINGS

The present disclosure is illustrated and described with reference to the various drawings, in which like reference numbers are used to denote like system components and/or method steps, as appropriate.

DETAILED DESCRIPTION

Figure 1:
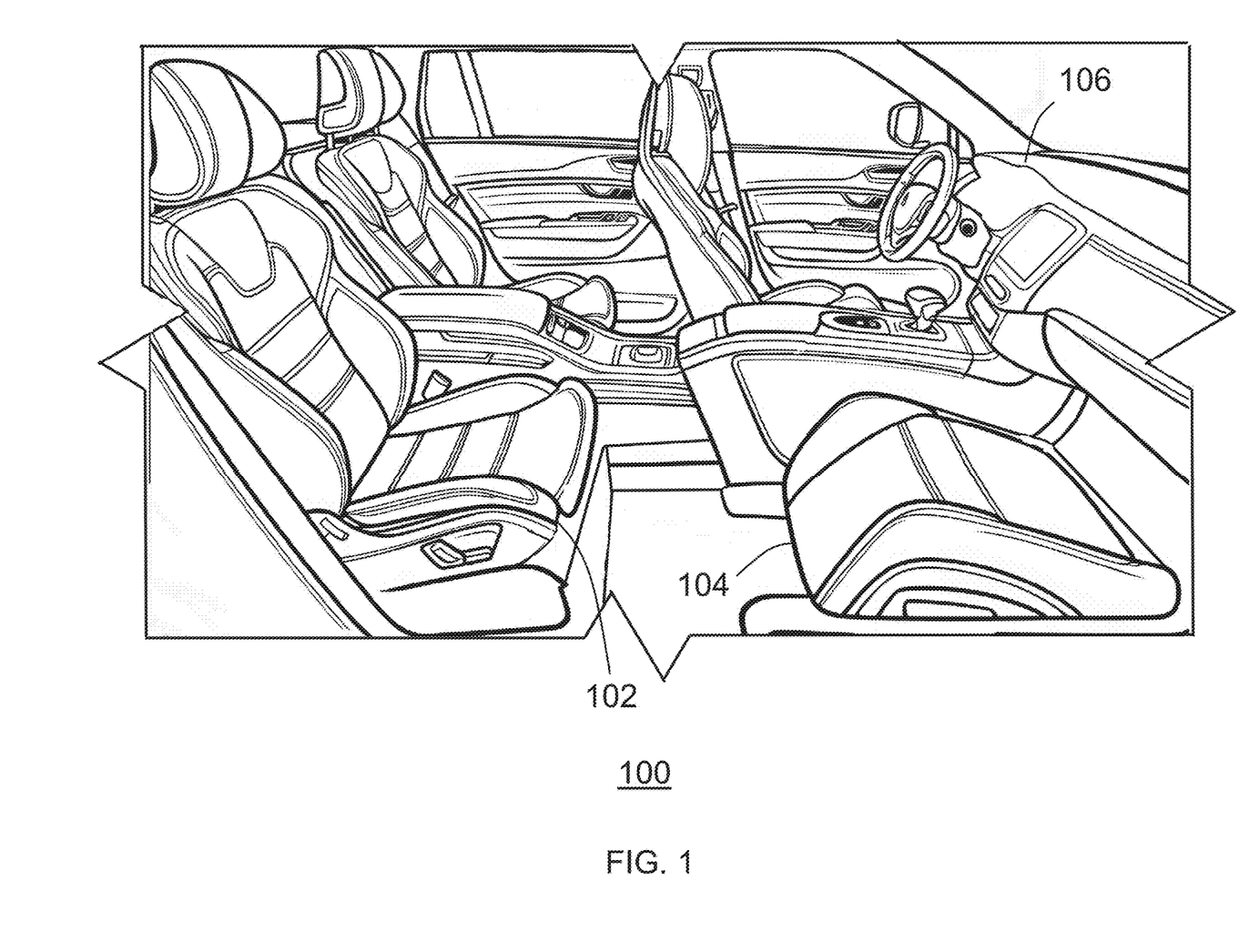
FIG. 1 is a perspective view of one illustrative embodiment of an interior environment of a vehicle.

FIG. 1 is a perspective view of one illustrative embodiment of an interior environment 100 of a vehicle. Shown is a seat 102 having a seat bottom attached to the floor of the vehicle. Also shown is a foot rest 104 that is also attached to the floor of the vehicle between the seat 102 and a front instrument panel 106. As described in more detail herein, the foot rest 104 stores an airbag (shown in FIG. 4). The airbag deploys from the foot rest, and the airbag deploys over a portion of legs of a user occupying the seat to protect the legs of the user during a collision. It is also contemplated herein that the foot rest 104 may simply be disposed adjacent to the floor of the vehicle, or may be integrally formed with the floor of the vehicle. For example, the foot rest 104 may be adjustable with or with respect to the seat 102 such that the foot rest 104 may comfortably accommodate different sized user bodies and legs.

Figure 2:
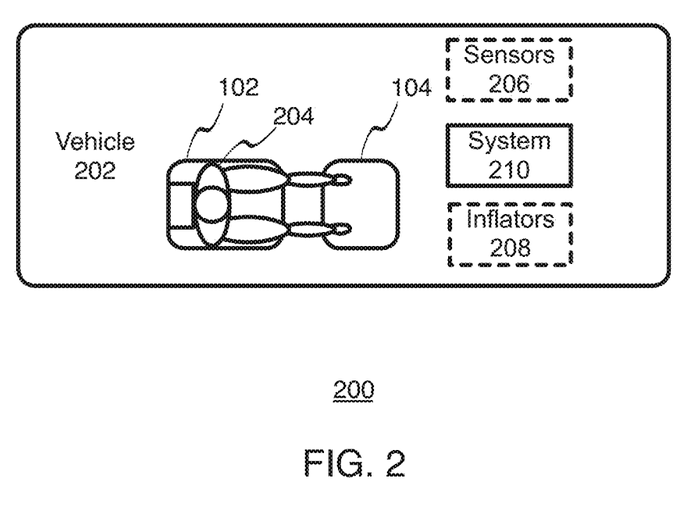
FIG. 2 is a top view of one illustrative embodiment of an exterior environment of a vehicle.

FIG. 2 is a top view of one illustrative embodiment of an exterior environment 200 of a vehicle 202. The vehicle 202 may be used to implement the vehicle shown in FIG. 1. For example, shown are the seat 102 and the foot rest 104.

Also shown is a user 204 seated in the seat 102. The terms user and occupant may be used interchangeably. In this example scenario, one occupant is shown for ease of illustration. In this example, the occupant may represent a passenger of the vehicle 202. In some scenarios, depending on the country and on what side the steering is located, this occupant may represent the driver of the vehicle 202, who controls the vehicle 202. In some scenarios, the vehicle may be an autonomous vehicle that drives with no driver, where all occupants are passengers. Embodiments described herein may apply to various seats of a vehicle, and may be independent from the location of a steering wheel, if any.

The vehicle 202 also includes sensors 206, inflators 208, and a system 210. The sensors 206 may represent a group of sensors, which may include external and internal sensors (not shown). The number of sensors 206 and the locations of the sensors 206 may vary, depending on the particular implementation. Example embodiments directed to the sensors 206 and the inflators 208 are described in more detail herein.

The vehicle 202 also includes airbags (not shown), which include front airbags, side airbags, and an airbag stored in the foot rest 104. The front airbags when in non-deployed states may be positioned behind the steering wheel in front of the driver, and behind the dashboard panel proximate to a front passenger. Side airbags when in non-deployed states may be positioned proximate to side B-pillars (not shown) or at the outer side of the seat 102 or outer side of the back of the seat 102 closest to the exterior of the vehicle. The particular airbag locations may vary, depending on the particular implementation.

As described in more detail herein, the airbags deploy upon impact or just before impact, depending on the particular implementation. The inflators 208 may represent a group of inflators that are spread out around the vehicle 202 proximate to respective airbags. The number of inflators 208 and the locations of the inflators 208 may vary, depending on the particular implementation.

For ease of illustration, FIG. 2 shows one block for each of the seat 102, the foot rest 104, the sensors 206, the inflators 208, and the system 210. These blocks 102, 104, 206, 208, and 210 may represent multiple seats, foot rests, sensors, inflators, and systems. In other implementations, environment 200 may not have all of the components shown and/or may have other elements including other types of elements instead of, or in addition to, those shown herein.

While the system 210 performs implementations described herein, in other implementations, any suitable component or combination of components associated with the system 210 or any suitable processor or processors associated with the system 210 may facilitate performing the implementations described herein.

Figure 3:
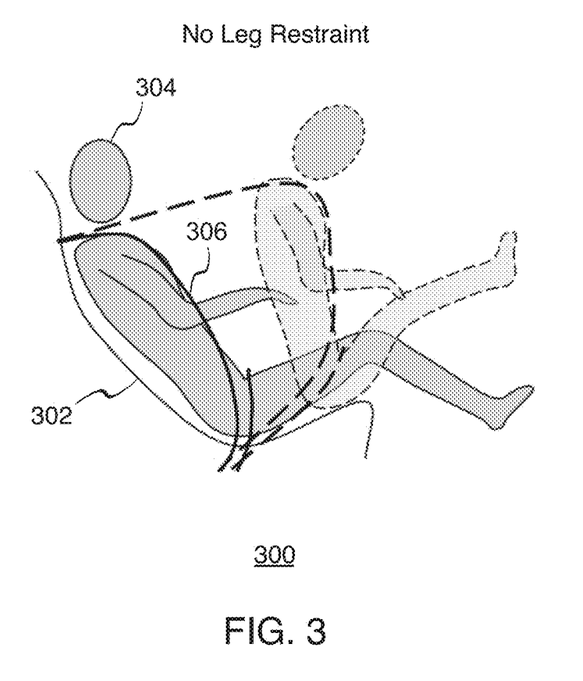
FIG. 3 is a side view of one illustrative embodiment of an interior environment of a vehicle, where there is no leg restraint provided by an airbag in a foot rest.

FIG. 3 is a side view of one illustrative embodiment of an interior environment 300 of a vehicle, where there is no leg restraint provided by an airbag in a foot rest. Shown is a seat 302 that is occupied by a user 304. The user 304 is retrained by a seat belt 306 but not by an airbag in a foot rest, as there is no foot rest in this scenario.

Figure 4:
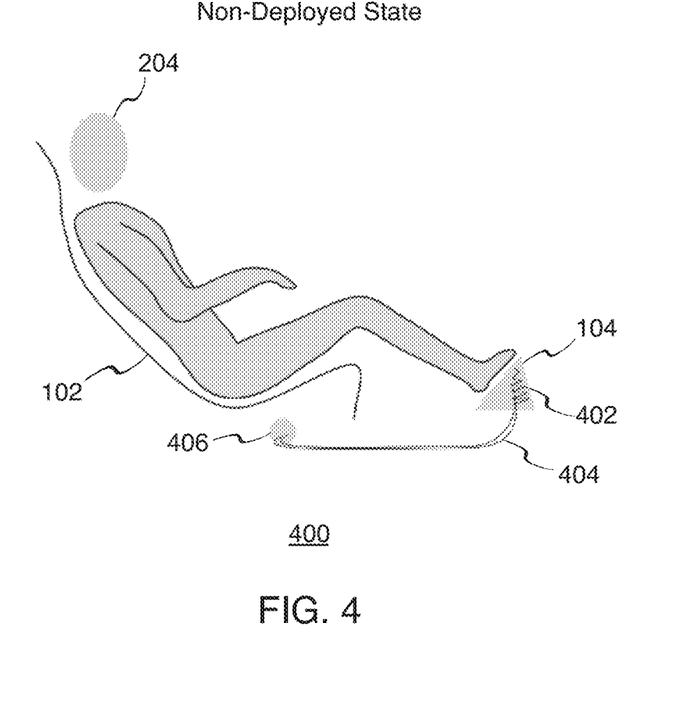
FIG. 4 is a side view of one illustrative embodiment of an interior environment of a vehicle, where an airbag stored in the foot rest provides leg restraint during a collision.

FIG. 4 is a side view of one illustrative embodiment of an interior environment 400 of a vehicle, where the airbag 402 stored in the foot rest 104 provides leg restraint during a collision. Shown is the seat 102 that is occupied by the user 204, where the user's feet are resting against the foot rest 104. The foot rest 104 provides comfort for the user's legs and feet during long travels. The foot rest 104 stores the airbag 402 while the airbag 402 is in a non-deployed state.

In various embodiments, the airbag 402 is coupled to a tether 404. Tether 404 may include tether straps that are coupled to an anchorage point (not shown) in the seat 102 via a passage 406. The tether 404 also has tether straps that are coupled to an anchorage point (not shown) in the seat 102 via a passage (not shown) on the other side of the seat 102. In various embodiments, both the airbag and the tether 404 are hidden from view and hidden from access by the user 204. For example, as indicated above, the airbag 402 is contained in the foot rest 104 when the airbag 402 is in a non-deployed state. Also, the tether 404 may be located underneath the carpet or side panels of the vehicle. Whether behind a carpet or panel, the tether 404 may be just behind a weakened area or slit through which the tether 404 may tear or pass during deployment.

As described in more detail herein, the airbag 402 deploys based on one or more collision policies. In various embodiments, when the airbag 402 is in a non-deployed configuration or state, the foot rest 104 functions to provide a platform or surface for the user 204 to rest his or her feet. Example embodiments directed to the airbag 402 in a deployed configuration or state are described in more detail herein.

Figure 5:
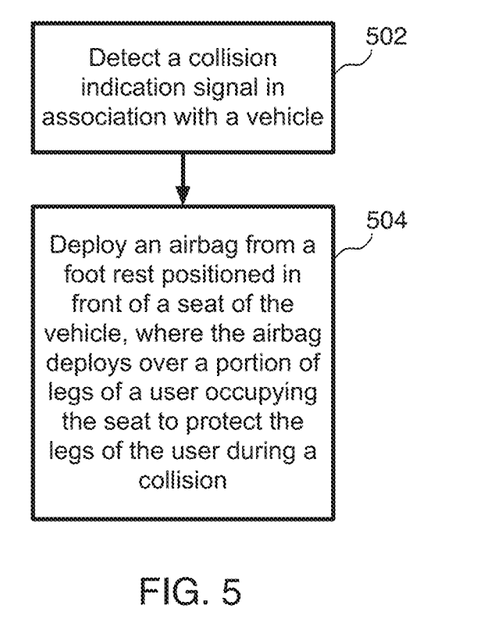
FIG. 5 is an example flow diagram of an illustrative method for enhancing front impact protection of passengers in a vehicle during a collision.

FIG. 5 is an example flow diagram of an illustrative method for enhancing front impact protection of occupants in a vehicle during a collision. Referring to both FIGS. 2 and 5, a method is initiated at block 502, where a system such as the system 210 detects a collision indication signal in association with a vehicle. In various embodiments, a collision indication signal may include pre-crash warning signals and crash detection signals. As described in more detail herein, a pre-crash warning signal is triggered when the system collects sufficient data to predict an imminent or impending crash before impact from a crash. A crash detection signal is triggered when the system detects an actual impact from a crash.

Figure 6:
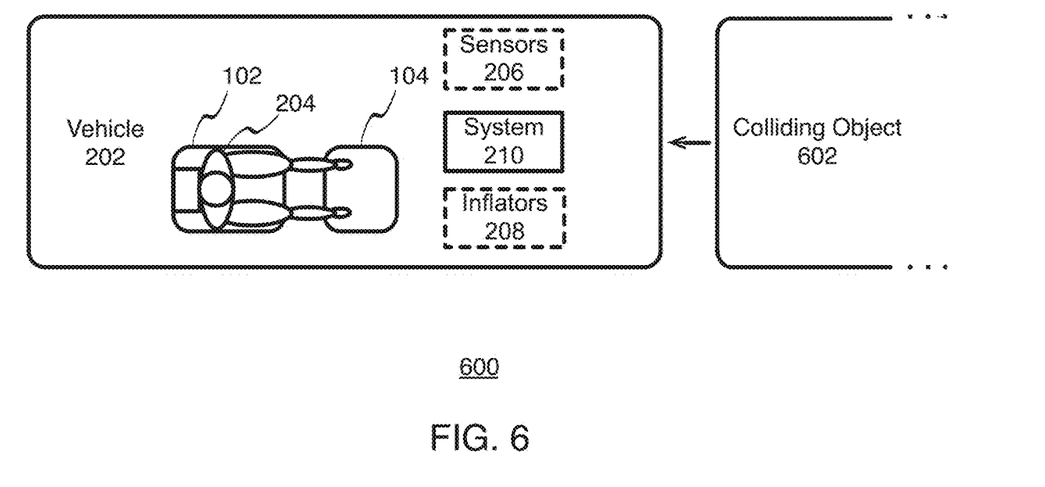
FIG. 6 is a top view of one illustrative embodiment of an exterior environment of a vehicle.

FIG. 6 is a top view of one illustrative embodiment of an exterior environment 600 of a vehicle. Shown are the seat 102 and the foot rest 104. Also shown is the user 204 seated in the seat 102. Also shown are the sensors 206, the inflators 208, and the system 210. As shown, a colliding object 602, which may be another vehicle, is about to make impact or collide with the vehicle 202.

At block 504, the system deploys the airbag 402 from the foot rest 104 positioned in front of the seat 102 of the vehicle. As described in more detail in connection with FIG. 6, the airbag deploys over a portion of the legs of user 204 occupying the seat 102 to protect the legs of the user during a collision.

Figure 7:
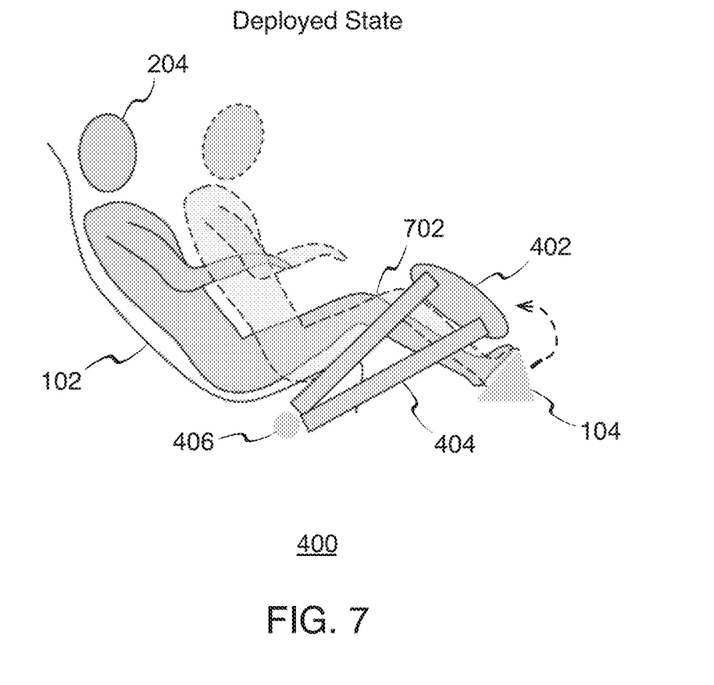
FIG. 7 is a side view of one illustrative embodiment of the interior environment of a vehicle, where an airbag provides leg restraint during a collision.

FIG. 7 is a side view of one illustrative embodiment of the interior environment 400 of a vehicle, where the airbag 402 provides leg restraint during a collision. Shown is the seat 102 that is occupied by the user 204 where the user's feet are resting against the foot rest 104.

As indicated above, the foot rest 104 stores the airbag 402, which is hidden from view and access by the user 204 while the airbag 402 is in a non-deployed state. In operation, when in a deployed state as shown, the airbag 402 deploys over a portion of the legs of the user 204 occupying the seat 102 to protect the legs of the user during a collision.

In one illustrative embodiment, the airbag is configured to restrain the legs of the user during a collision. As indicated above, the airbag 402 is coupled to the tether 404. As shown, the tether 404 includes tether straps that are coupled to an anchorage point (not shown) in the seat 102 via the passage 406. The tether 404 also has tether straps that are coupled to an anchorage point (not shown) in the seat 102 via a passage (not shown) on the other side of the seat 102.

In one illustrative embodiment, the airbag is tethered to the seat during the collision. As indicated above, the tether 404 is hidden from view and hidden from access by the user 204 when the airbag 402 is in a non-deployed state. In operation, when in a deployed state as shown, the tether 404 pulls the airbag 402 toward the seat 102. Because the airbag deploys over a portion of the legs 702 of the user 204 (e.g., the user's shins) as shown, the tether 404 pulls the airbag 402 against the legs 702 of the user 204. The tether 404 limits the position of the airbag 402 and cradles the front of the user's legs 702, thereby restraining the legs of the user 204 from excessive forward movement and protecting the legs of the user during a collision.

In various embodiments, the number of tether straps may vary, depending on the particular implementation. For example, there are two tether straps attached to one side of the airbag 402 as shown, and there are two other tether straps (not shown) attached to the other side of the airbag 402. Having more tether straps provides more stability to the airbag 402 as it restrains the legs of the user 204. All of the tether straps may be referred to collectively as the tether 404.

In one illustrative embodiment, the airbag 402 is positioned over the legs of the user based on one or more characteristics of the user. In various embodiments, the lengths of the tether straps may be adaptive based on one or more characteristics of the user, such as the user's size (e.g., length of the user's legs), the user's seating position, and the location of the user's feet while resting on the foot rest 104. In various embodiments, the system may also utilize cameras or weight measurement devices to determine the size of the user. For example, if the system detects a larger user, the system may automatically adjust the length of the tether 404 longer and/or adjust the tension to less tension at least initially, and then dynamically adjust the tension as needed. Conversely, if the system detects a smaller user, the system may automatically adjust the length of the tether 404 shorter and/or the tension to more tension at least initially, and then dynamically adjust the tension as needed.

Upon deployment, the airbag 402 comes forward and out from the foot rest 104 and then upward in front of the user's legs 702 as indicated by the curved dotted arrow. The airbag 402 ultimately lands and rests on the legs 702 of the user 204, as shown.

In various embodiments, the tension of the tether 404 may be controlled based on a force-displacement characteristic. For example, if the legs 702 of the user thrust forward with a great force, the system may increase the tension of the tether 404 with a proportional force. The amount of force may vary, depending on the particular implementation. In some embodiments, the tension of the tether 404 may be fixed.

In some embodiments, to further improve impact protection for the user 204, the system may deploy an airbag (not shown) from the instrument panel in front of the foot rest 104. In various embodiments, the system deploys the airbag 402 using an explosive inflator such as one of the inflators 208. This enables the airbag 402 to inflate immediately. This also enables the airbag 402 to deploy and fully inflate and protect the user 204 before a front airbag (not shown) in the instrument panel fully deploys.

In one illustrative embodiment, the airbag deploys based on one or more collision policies, which are applied by activation logic of the system. In one illustrative embodiment, at least one collision policy of the one or more collision policies causes the airbag to deploy in response to a pre-crash warning signal. As a result, the airbag 402 may be deployed just before impact based on the pre-crash warning signal. This enables the airbag to be deployed rapidly and well before an actual collision. As such, the system may enhance protection of the occupant well before a collision. In one illustrative embodiment, at least one collision policy of the one or more collision policies causes the airbag to deploy in response to a crash detection signal. As a result, the airbag 402 may be deployed at impact based on the crash detection signal.

Pre-crash warning signals and crash detection signals may be more generally referred to as collision indication signals. In other words, a collision indication signal may include pre-crash warning signals and crash detection signals. As indicated above, a pre-crash warning signal is triggered when the system collects sufficient data to predict an imminent or impending crash before impact from a crash. A crash detection signal is triggered when the system detects an actual impact from a crash. In an illustrative embodiment, at least one collision policy causes the airbag 402 to deploy in response to a pre-crash warning signal. In an illustrative embodiment, at least one collision policy causes the airbag 402 to deploy in response to a crash detection signal. In this scenario, the system 210 deploys the airbag 402 along with other airbags in the vehicle substantially simultaneously responsive to the crash detection signal.

Figure 8:
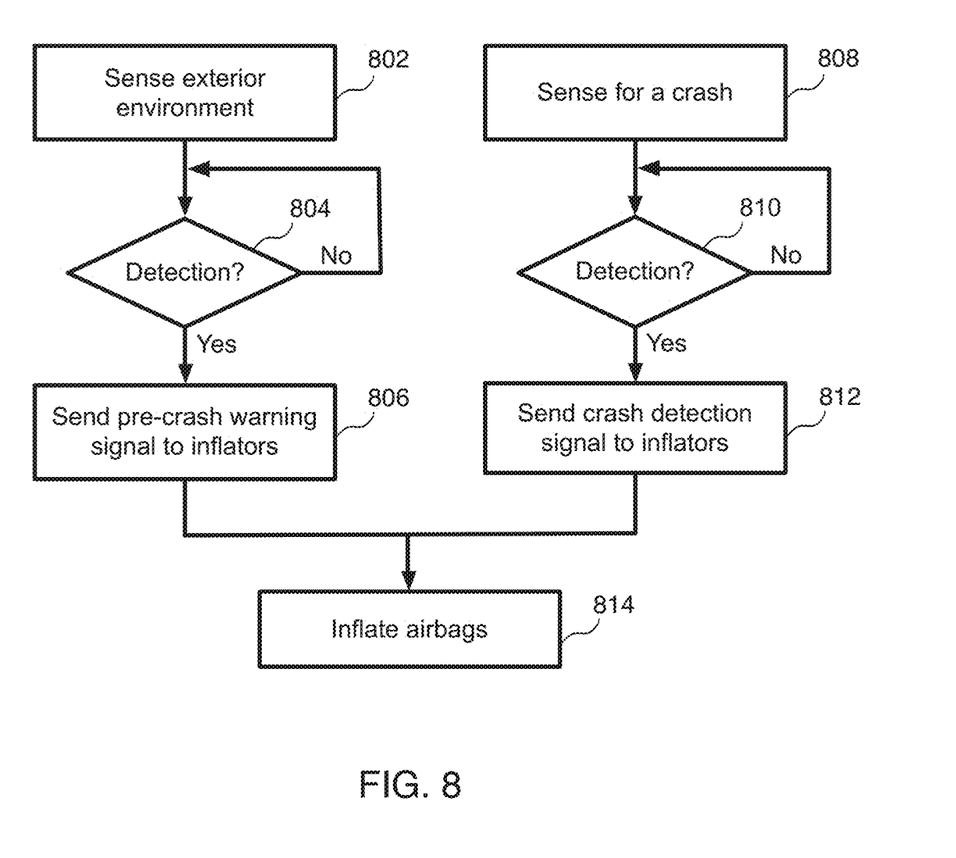
FIG. 8 is an example flow diagram of an illustrative method for enhancing front impact protection of passengers in a vehicle during a collision.

FIG. 8 is an example flow diagram of an illustrative method for enhancing front impact protection of passengers in a vehicle during a collision. Referring to both FIGS. 2 and 8, a method is initiated at block 802, where a system such as the system 210 senses the exterior environment. As indicated above, the system utilizes a variety of sensors, including exterior sensors. For example, exterior sensors may include one or more cameras, radar, etc.

At block 804, if one or more sensors do not detect sufficient data amounting to a pre-crash warning, the system continues to sense or monitor the exterior environment, at block 802. If one or more sensors detect sufficient data amounting to a pre-crash warning, the flow continues to block 806.

At block 806, the system sends a pre-crash warning signal to the appropriate inflators. In response to the pre-crash warning signal, the inflators inflate their respective airbags accordingly. In various embodiments, the system may include a pre-crash warning module (not shown), which processes and analyzes incoming data from the sensors 206. For example, the system may detect objects within a predetermined distance (e.g., 6 feet, 10 feet, 20 feet, etc.). The system may track such objects to compute any decrease in distance between the colliding object 602 and the vehicle 202. The system may track such objects to also compute a relative velocity of the colliding object 602 and the vehicle 202. In various embodiments, the pre-crash warning module of the system 210 may determine that a side impact or crash is imminent based on a predetermined decreasing of the distance between an object such as the colliding object 602 and the vehicle 202 and based on a predetermined minimum relative velocity between an object such as the colliding object 602 and the vehicle 202.

At block 808, the system senses for a crash. As indicated above, the system utilizes a variety of sensors, including crash sensors. For example, exterior sensors may include one or more crash sensors, etc.

At block 810, if one or more sensors do not detect a crash, the system continues to sense or monitor the exterior environment, at block 808. If one or more sensors detect a crash, the flow continues to block 812.

At block 812, the system sends a crash detection signal to the appropriate inflators. In various embodiments, the system may include a crash detection module (not shown), which processes and analyzes incoming data from the sensors 206. For example, the system may detect actual physical impact by an object such as the colliding object 602 and the vehicle 202. In various embodiments, the crash detection module of the system 210 may determine that a side impact or crash is occurring based on a predetermined amount of force acting upon the vehicle 202 by an object such as the colliding object 602.

At block 814, the system inflates the airbag. As indicated above, the system may utilize an explosive inflator to deploy and inflate the airbag. This ensures that the airbag is deployed sufficiently early so as to protect the user during a collision.

Figure 9:
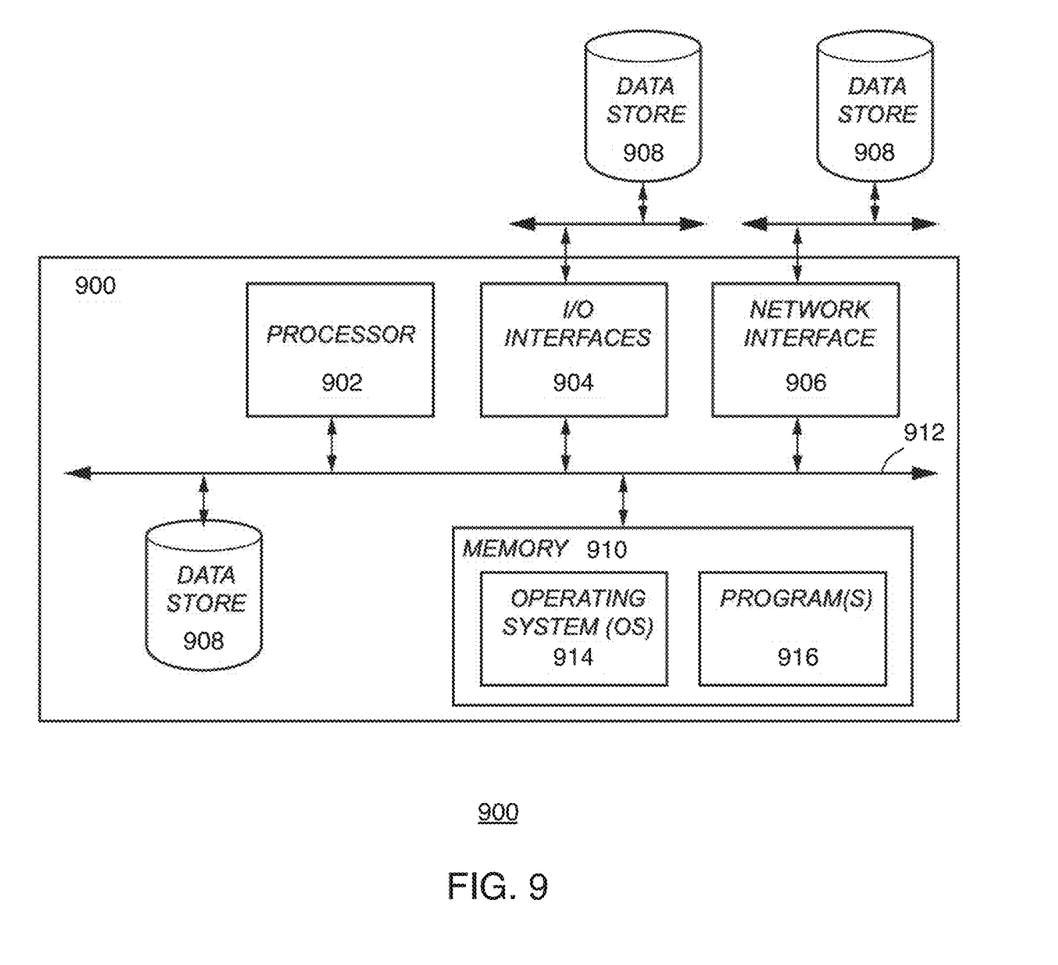
FIG. 9 is a schematic diagram illustrating a general-purpose electronic control unit (ECU) 900 that may be utilized in conjunction with the embodiments of the present disclosure.

FIG. 9 is a schematic diagram illustrating a general-purpose electronic control unit (ECU) 900 that may be utilized in conjunction with the embodiments of the present disclosure. For example, ECU 900 may be used to implement system 210 of FIG. 2, as well as to perform implementations described herein. The ECU 900 may be a digital computer that, in terms of hardware architecture, generally includes a processor 902, input/output (I/O) interfaces 904, a network interface 906, a data store 908, and memory 910. It should be appreciated by those of ordinary skill in the art that FIG. 9 depicts the ECU 900 in an oversimplified manner, and a practical embodiment may include additional components and suitably configured processing logic to support known or conventional operating features that are not described in detail herein. The components (902, 904, 906, 908, and 910) are communicatively coupled via a local interface 912. The local interface 912 may be, for example, but is not limited to, one or more buses or other wired or wireless connections, as is known in the art. The local interface 912 may have additional elements, which are omitted for simplicity, such as controllers, buffers (caches), drivers, repeaters, and receivers, among many others, to enable communications. Further, the local interface 912 may include address, control, and/or data connections to enable appropriate communications among the aforementioned components.

The processor 902 is a hardware device for executing software instructions. The processor 902 may be any custom made or commercially available processor, a central processing unit (CPU), an auxiliary processor among several processors associated with the ECU 900, a semiconductor-based microprocessor (in the form of a microchip or chipset), or generally any device for executing software instructions. When the ECU 900 is in operation, the processor 902 is configured to execute software stored within the memory 910, to communicate data to and from the memory 910, and to generally control operations of the ECU 900 pursuant to the software instructions. The I/O interfaces 904 may be used to receive user input from and/or for providing system output to one or more devices or components.

The network interface 906 may be used to enable the ECU 900 to communicate on a network. The network interface 906 may include, for example, an Ethernet card or adapter (e.g., 10BaseT, Fast Ethernet, Gigabit Ethernet, or 10 GbE) or a Wireless Local Area Network (WLAN) card or adapter (e.g., 802.11a/b/g/n/ac). The network interface 906 may include address, control, and/or data connections to enable appropriate communications on the network. A data store 908 may be used to store data. The data store 908 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 908 may incorporate electronic, magnetic, optical, and/or other types of storage media. In one example, the data store 908 may be located internal to the ECU 900, such as, for example, an internal hard drive connected to the local interface 912 in the ECU 900. Additionally, in another embodiment, the data store 908 may be located external to the ECU 900 such as, for example, an external hard drive connected to the I/O interfaces 904 (e.g., a SCSI or USB connection). In a further embodiment, the data store 908 may be connected to the ECU 900 through a network, such as, for example, a network-attached file server.

The memory 910 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 910 may incorporate electronic, magnetic, optical, and/or other types of storage media. Note that the memory 910 may have a distributed architecture, where various components are situated remotely from one another but can be accessed by the processor 902. The software in memory 910 may include one or more software programs, each of which includes an ordered listing of executable instructions for implementing logical functions. The software in the memory 910 includes a suitable operating system (O/S) 914 and one or more programs 916. The operating system 914 essentially controls the execution of other computer programs, such as the one or more programs 916, and provides scheduling, input-output control, file and data management, memory management, and communication control and related services. The one or more programs 916 may be configured to implement the various processes, algorithms, methods, techniques, etc. described herein.

It will be appreciated that some embodiments described herein may include one or more generic or specialized processors ("one or more processors") such as microprocessors; central processing units (CPUs); digital signal processors (DSPs); customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a read-only memory (ROM), a programmable read-only memory (PROM), an erasable programmable read-only memory (EPROM), an electrically erasable programmable read-only memory (EEPROM), flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A collision protection system for a vehicle, the collision protection system comprising:
   a seat having a seat bottom attached to a floor of the vehicle;
   a foot rest disposed adjacent to, attached to, or integrally formed with the floor of the vehicle and separated from the seat bottom; and
   an airbag that deploys from, adjacent to, or around the foot rest, wherein the airbag is configured to deploy over a portion of legs of a user occupying the seat to protect the legs of the user during a collision, wherein the airbag is tethered to the seat bottom itself during the collision.

2. The collision protection system of claim 1, wherein the airbag is configured to restrain the legs of the user during the collision.

3. The collision protection system of claim 1, wherein the airbag is tethered to the seat bottom itself during the collision by one or more tethers attached to one or more sides of the seat bottom itself.

4. The collision protection system of claim 1, wherein the airbag is configured to be positioned over the legs of the user based on one or more characteristics of the user.

5. The collision protection system of claim 1, wherein the airbag deploys based on one or more collision policies.

6. The collision protection system of claim 1, wherein the airbag deploys based on one or more collision policies, and wherein at least one collision policy of the one or more collision policies causes the airbag to deploy in response to a pre-crash warning signal.

7. The collision protection system of claim 1, wherein the airbag deploys based on one or more collision policies, and wherein at least one collision policy of the one or more collision policies causes the airbag to deploy in response to a crash detection signal.

8. A frontal-impact protection assembly for a vehicle, the frontal-impact protection assembly comprising:
   a foot rest disposed adjacent to, attached to, or integrally formed with a floor of the vehicle and separated from a seat bottom of a seat attached to the floor of the vehicle; and
   an airbag that deploys from, adjacent to, or around the foot rest, wherein the airbag is configured to deploy over a portion of legs of a user occupying the seat of the vehicle to protect the legs of the user during a collision, wherein the airbag is tethered to the seat bottom itself during the collision.

9. The frontal-impact protection assembly of claim 8, wherein the airbag is configured to restrain the legs of the user during the collision.

10. The frontal-impact protection assembly of claim 8, wherein the airbag is tethered to the seat bottom itself during the collision by one or more tethers attached to one or more sides of the seat bottom itself.

11. The frontal-impact protection assembly of claim 8, wherein the airbag is configured to be positioned over the legs of the user based on one or more characteristics of the user.

12. The frontal-impact protection assembly of claim 8, wherein the airbag deploys based on one or more collision policies.

13. The frontal-impact protection assembly of claim 8, wherein the airbag deploys based on one or more collision policies, and wherein at least one collision policy of the one or more collision policies causes the airbag to deploy in response to a pre-crash warning signal.

14. The frontal-impact protection assembly of claim 8, wherein the airbag deploys based on one or more collision policies, and wherein at least one collision policy of the one or more collision policies causes the airbag to deploy in response to a crash detection signal.

15. A method comprising:
   detecting a collision indication signal in association with a vehicle; and
   deploying an airbag from, adjacent to, or around a foot rest positioned in front of a seat of the vehicle, wherein the foot rest is disposed adjacent to, attached to, or integrally formed with a floor of the vehicle and separated from a seat bottom of the seat of the vehicle attached to the floor of the vehicle, wherein the airbag is configured to deploy over a portion of legs of a user occupying the seat to protect the legs of the user during a collision, wherein the airbag is tethered to the seat bottom itself during the collision.

16. The method of claim 15, wherein the airbag is configured to restrain the legs of the user during the collision.

17. The method of claim 15, wherein the airbag is tethered to the seat bottom itself during the collision by one or more tethers attached to one or more sides of the seat bottom itself.

18. The method of claim 15, wherein the airbag is configured to be positioned over the legs of the user based on one or more characteristics of the user.

19. The method of claim 15, wherein the airbag deploys based on one or more collision policies.

20. The method of claim 15, wherein the airbag deploys based on one or more collision policies, and wherein at least one collision policy of the one or more collision policies causes the airbag to deploy in response to a pre-crash warning signal.

* * * * *